US012420392B1

(12) United States Patent
Huang

(10) Patent No.: US 12,420,392 B1
(45) Date of Patent: Sep. 23, 2025

(54) NOZZLE MECHANISM REDUCING DISPLACEMENT

(71) Applicant: EVERWIN PNEUMATIC CORPORATION, Taichung (TW)

(72) Inventor: Wen-Sheng Huang, Taichung (TW)

(73) Assignee: EVERWIN PNEUMATIC CORP., Taichung (TW)

( * ) Notice: Subject to any disclaimer, the term of this patent is extended or adjusted under 35 U.S.C. 154(b) by 42 days.

(21) Appl. No.: 18/611,927

(22) Filed: Mar. 21, 2024

(51) Int. Cl.
*B25C 1/06* (2006.01)
*B25C 1/00* (2006.01)

(52) U.S. Cl.
CPC .............. *B25C 1/008* (2013.01); *B25C 1/001* (2013.01)

(58) Field of Classification Search
CPC .................................. B25C 1/008; B25C 1/06
USPC .......................................................... 227/120
See application file for complete search history.

(56) References Cited

U.S. PATENT DOCUMENTS

| | | | | |
|---|---|---|---|---|
| 8,011,441 | B2 * | 9/2011 | Leimbach | B25C 1/06 227/129 |
| 10,549,412 | B2 * | 2/2020 | McCardle | B25C 1/06 |
| 12,179,325 | B2 * | 12/2024 | Neuhoff | B25C 1/008 |
| 2007/0272422 | A1 * | 11/2007 | Coleman | B25C 1/06 173/1 |
| 2018/0117748 | A1 * | 5/2018 | Ishikawa | B25C 1/046 |
| 2019/0344414 | A1 * | 11/2019 | Lin | B25C 1/047 |
| 2019/0366527 | A1 * | 12/2019 | Akiba | B25C 5/15 |
| 2020/0189080 | A1 * | 6/2020 | Aizawa | B25C 1/06 |
| 2024/0149416 | A1 * | 5/2024 | Sutherland | B25C 1/04 |
| 2025/0001571 | A1 * | 1/2025 | Akiba | B25C 1/003 |

* cited by examiner

*Primary Examiner* — Praachi M Pathak
(74) *Attorney, Agent, or Firm* — MUNCY, GEISSLER, OLDS & LOWE, P.C.

(57) ABSTRACT

A nozzle mechanism reducing displacement includes a main board, a pushing plate, a safety, a position limiting sleeve, an abutting member, and a cover. The main plate has two slide rails, with a nail feeding channel, slot, and nail pushing recess disposed therebetween. The pushing plate has concave slide grooves disposed on the bottom part to be slidably disposed in the nail pushing recess. The safety is fixed on the main board. The position limiting sleeve has a protrusion part on the top face and beneath the slot. The abutting member is mounted around the bottom face of the position limiting sleeve. The cover is on the main board. The combination of the position limiting sleeve and the main board effectively limits the nozzle inner diameter. In operation, deviation of the fired nail is reduced, so the nail is stably and accurately projected to the workpiece surface.

10 Claims, 7 Drawing Sheets

NOZZLE MECHANISM REDUCING DISPLACEMENT

BACKGROUND OF THE INVENTION

1. Field of the Invention

The present invention relates to nozzle mechanism, and more particularly, to a nozzle mechanism reducing displacement.

2. Description of the Related Art

In the nail ejecting process of a conventional nail gun, a 2.8 mm displaceable gap exists between the nail and the nozzle, causing the nail to displace by a certain degree after being fired. Due to said displacement, when the fired nail lands on the workpiece, a larger displacement is caused, which in turn affects the appearance of the workpiece and may have an adverse effect on the neatness and aesthetics of the workpiece surface, especially in applications requiring higher precision and neat appearance.

If the nail is fired and positioned in a more accurate and unified manner, the neatness and aesthetics of the workpiece surface being nailed are improved. Therefore, the improvement of the conventional nail gun nozzle is desirable.

SUMMARY OF THE INVENTION

To improve the issues above, the present invention discloses a nozzle mechanism capable of reducing the displacement of the fired nail, so as to lower the deviation of the nail.

For achieving the aforementioned objectives, the present invention provides a nozzle mechanism reducing displacement, comprising a main board, a pushing plate, a safety, a position limiting sleeve, an abutting member, and a cover. The main board comprises a concave groove on a lateral side, and two slide rails disposed in a parallel and symmetric arrangement, with a nail feeding channel, a slot, and a nail pushing recess between the two slide rails. The nail pushing recess is arranged above the nail feeding channel and the slot, wherein the nail feeding channel is not in communication with the slot. The pushing plate comprises a nail pushing block disposed on an end part thereof, and two slide grooves concavely disposed in parallel on the bottom part thereof. The slide grooves are correspondingly disposed in the slide rails, whereby the nail pushing block slides on the nail pushing recess. The safety comprises a fixing plate disposed in the concave groove. The position limiting sleeve comprises a protrusion part disposed on the top face thereof. A lateral wall plate extends upward from two sides of the top face of the position limiting sleeve, respectively. The position limiting sleeve is mounted around one end of the slide rails neighboring the slot. The lateral wall plates wrap the outer side wall of the corresponding slide rail. The protrusion part is disposed beneath the slot. An abutting edge is formed on one end of the abutting member. The abutting member is mounted around the bottom face of the position limiting sleeve, and one end of the position limiting sleeve abuts against the inner wall of the abutting edge. The bottom face of the cover is formed in a plane and comprises an arc-shaped and concave position limiting groove. The cover is disposed on the main board, such that the position limiting groove is arranged above the nail pushing recess.

With the combination of the position limiting sleeve and the main board, the protrusion part is arranged beneath the slot, so as to effectively limit the inner diameter of the nozzle. In operation, the upward and downward displacement degree of the fired nail which bears the force is reduced, such that the nail is stably ejected to the surface of the workpiece, assuring a more accurate landing position of the nail. Due to the reduction of the nail displacement degree, the interval between nails is maintained in a relatively consistent scope, thereby maintaining the neatness and aesthetics of the workpiece surface.

DETAILED DESCRIPTION OF THE INVENTION

Figure 1:
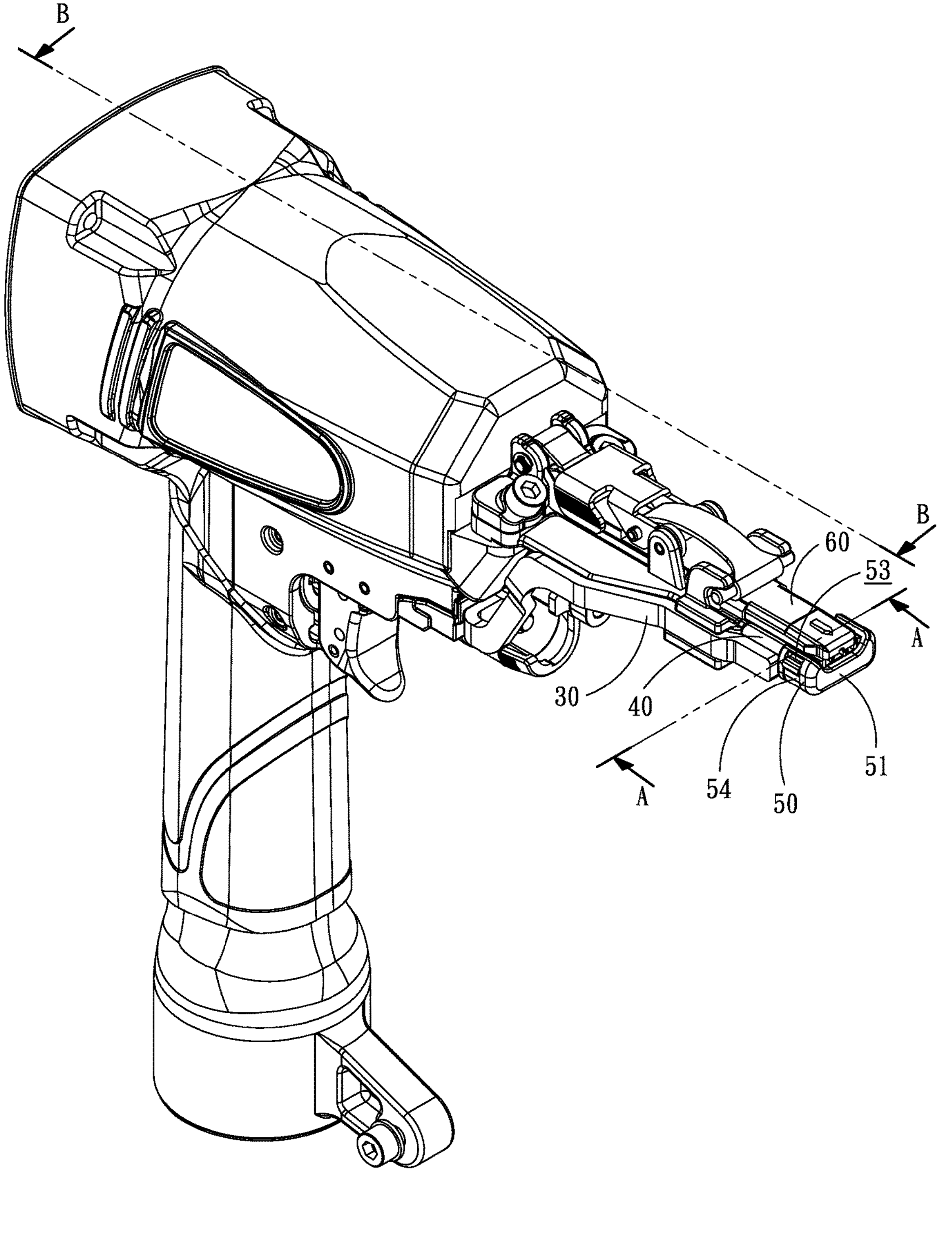
FIG. 1 is a perspective view of the nozzle mechanism combined with a nail gun in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The directional terms of, for example, "up", "down", "front", "rear", "left", "right", "inner", "outer", and "side" are only used herein for illustrating the relative directions shown in the drawings. Therefore, the directional terms are applied for the purpose of illustration and understanding of the present invention, instead of limiting the present invention.

Referring to FIG. 1 to FIG. 7, the present invention discloses a nozzle mechanism reducing displacement, comprising a main board 10, a pushing plate 20, a safety 30, a position limiting sleeve 40, an abutting member 50, and a cover 60.

The main board 10 comprises a concave groove 11 and two slide rails 12 disposed in a parallel and symmetric arrangement, with a nail feeding channel 13, a slot 14, and a nail pushing recess 15 disposed between the two slide rails 12. The nail pushing recess 15 is arranged above the nail feeding channel 13 and the slot 14. The nail feeding channel 13 is not in communication with the slot 14.

The pushing plate 20 comprises a nail pushing block 21 disposed on an end part thereof. Two slide grooves 22 are concavely disposed in parallel on a bottom part of the pushing plate 20. The slide grooves 22 are correspondingly disposed in the slide rails 12, whereby the nail pushing block 21 slides in the nail pushing recess 15.

The safety 30 comprises a fixing plate 31 on one end thereof, and the fixing plate 31 is disposed in the concave groove 11.

The position limiting sleeve 40 comprises a protrusion part 41 on a top face thereof. A lateral wall plate 42 extends upward from two sides of the top face of the position limiting sleeve 40, respectively. The position limiting sleeve 40 is mounted around one end of the slide rails 12 neighboring the slot 14. Each lateral wall plate 42 wraps an outer side wall of the corresponding slide rail 12. The protrusion part 41 is disposed beneath the slot 14.

An abutting edge 51 is formed on one end of the abutting member 50. The abutting member 50 is mounted around a bottom face of the position limiting sleeve 40, and one end of the position limiting sleeve 40 abuts against an inner wall of the abutting edge 51.

A bottom face of the cover 60 is formed in a plane and comprises an arc-shaped and concave position limiting groove 61. The cover 60 covers the main board 10, such that the position limiting groove 61 is arranged above the nail pushing recess 15.

Figure 2A:
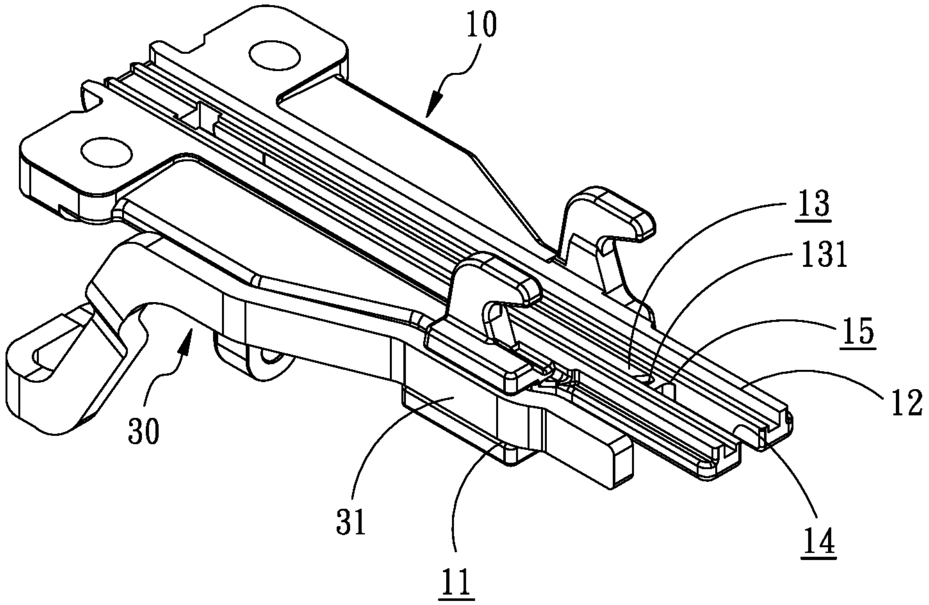
FIG. 2A is a perspective view of the main board combined with the safety in accordance with an embodiment of the present invention.
Figure 2B:
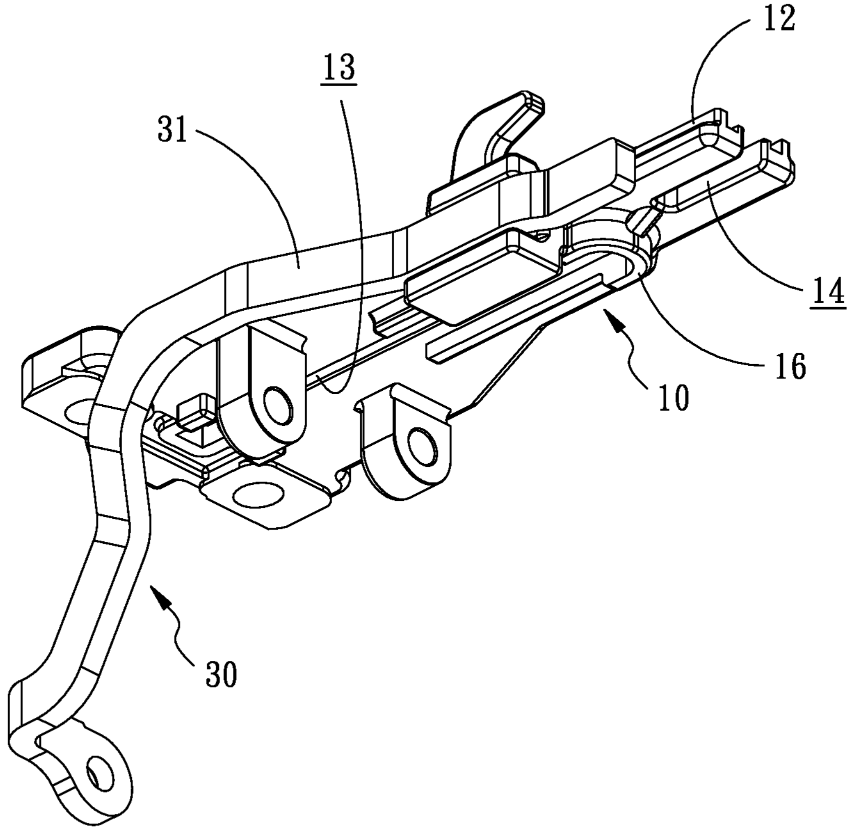
FIG. 2B is another perspective view of FIG. 2A taken from another viewpoint.

Referring to FIG. 2A and FIG. 2B, the fixing plate 31 comprises a curved lateral side wall, which is bent to contain at least one angle. The angle is bent corresponding to the shape of the lateral side of the main board 10. Also, the multi-angular arrangement provides an expansion and deformation allowance, so as to lower the possibility of damage caused by deformation of the safety 30.

Also referring to FIG. 2A and FIG. 2B, the main board 10 comprises a protruding strengthening part 16 disposed between the nail feeding channel 13 and the slot 14, wherein two ends of the strengthening part 16 extend toward the direction away from the slot 14. The strengthening part 16 improves the structural strength of the main board 10.

Figure 6:
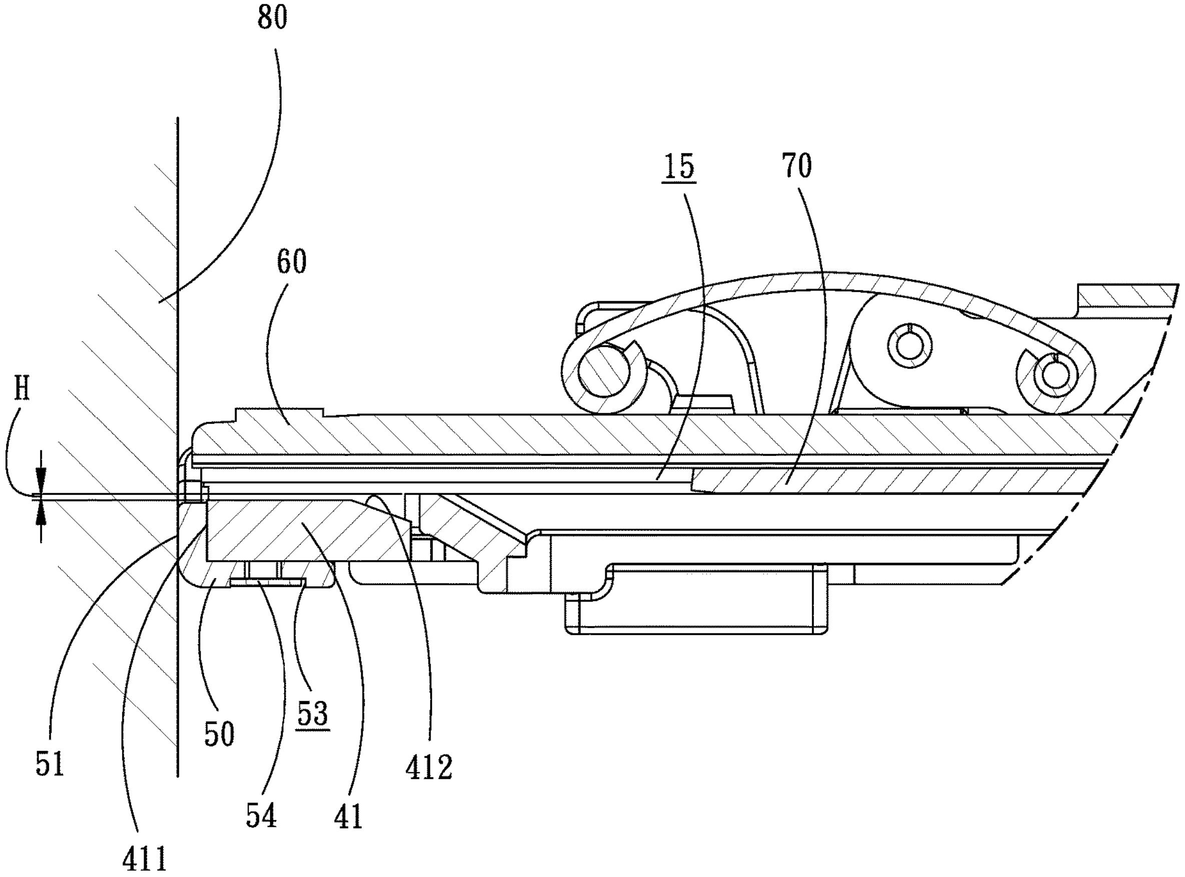
FIG. 6 is a schematic view of the present invention with the nail loaded before firing.
Figure 7:
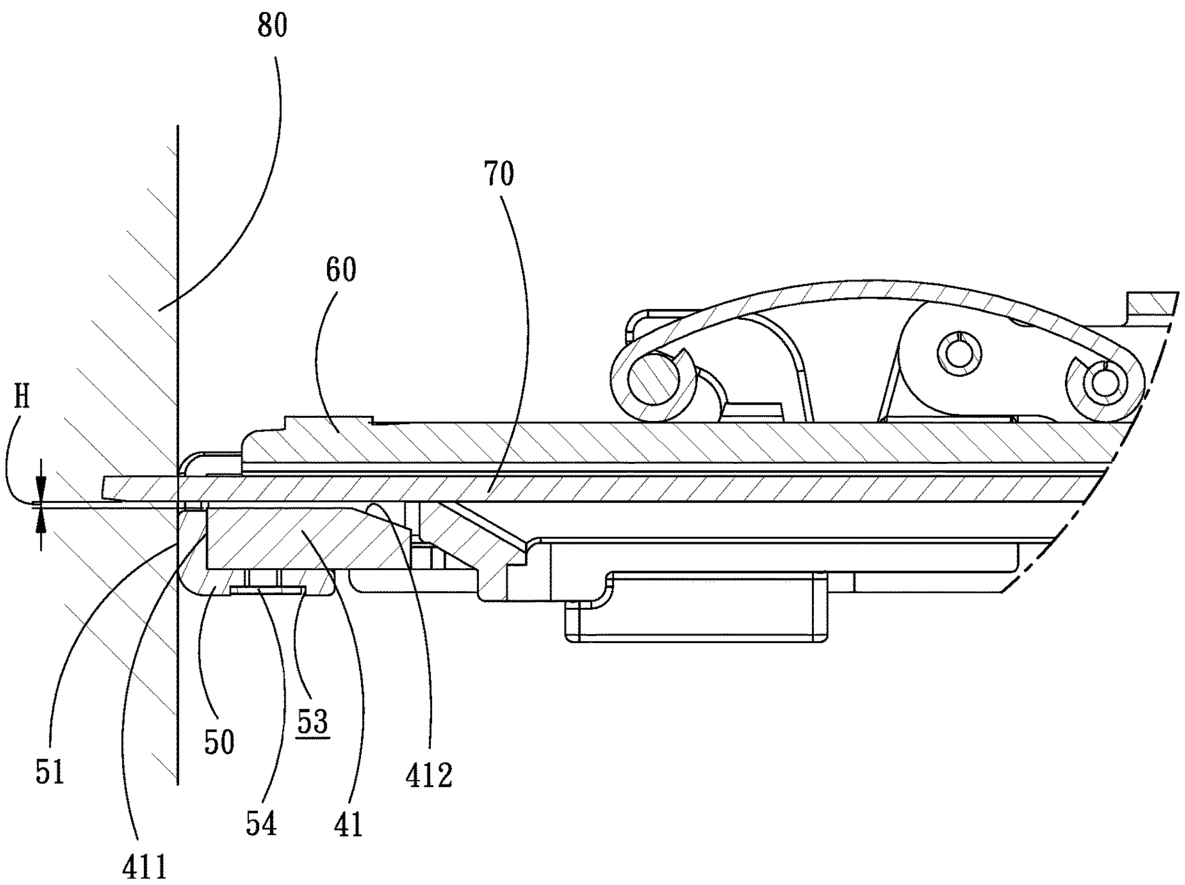
FIG. 7 is a schematic view of the present invention after the nail is fired.

Further referring to FIG. 2A and FIG. 2B, in view of FIG. 6 and FIG. 7, a bevel 131 is disposed on a channel wall of one end of the nail feeding channel 13 neighboring the slot 14, wherein the bevel 131 expands from the nail feeding channel 13 toward the direction of the nail pushing recess 15. In other words, the bevel 131 is inclined according to the firing direction of a nail 70, so that the fired nail 70 moves along the direction of the bevel 131.

Figure 3:
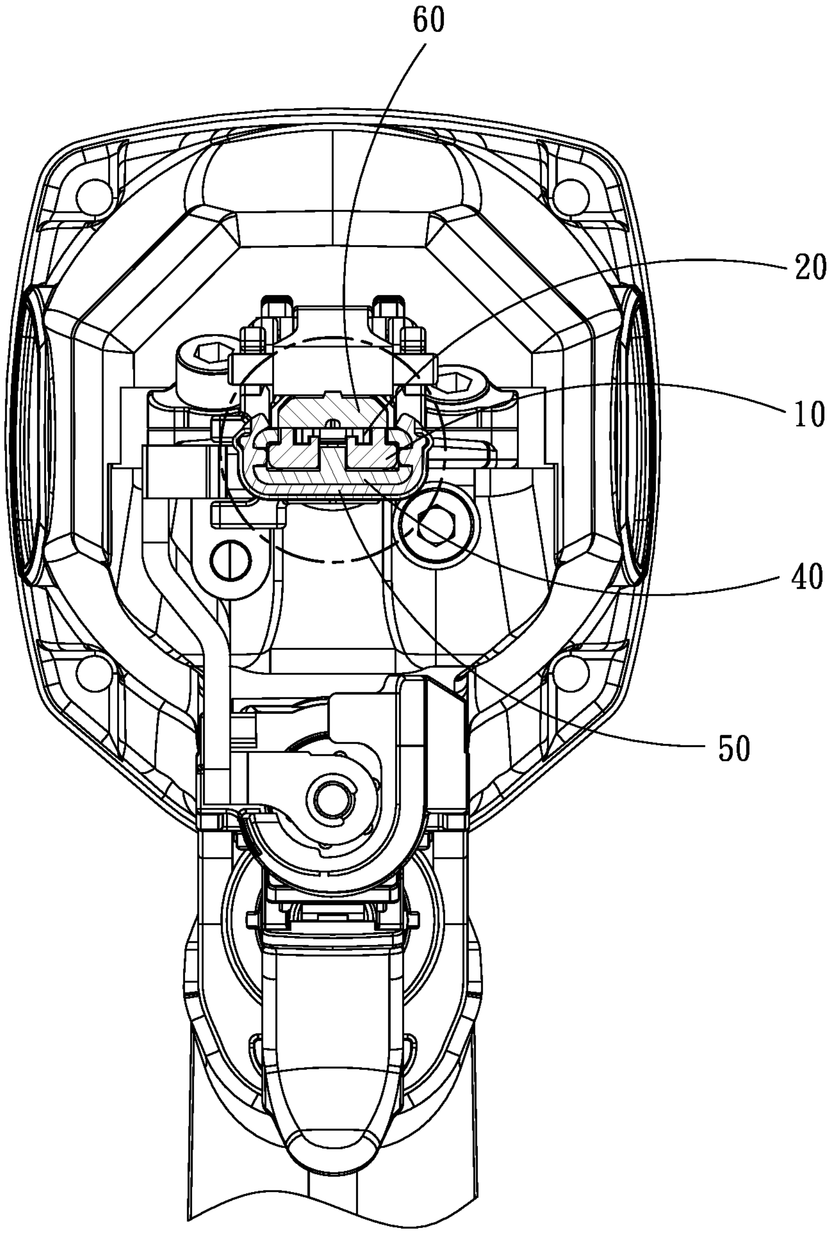
FIG. 3 is a cross sectional view taken along line A-A in FIG. 1.
Figure 4:
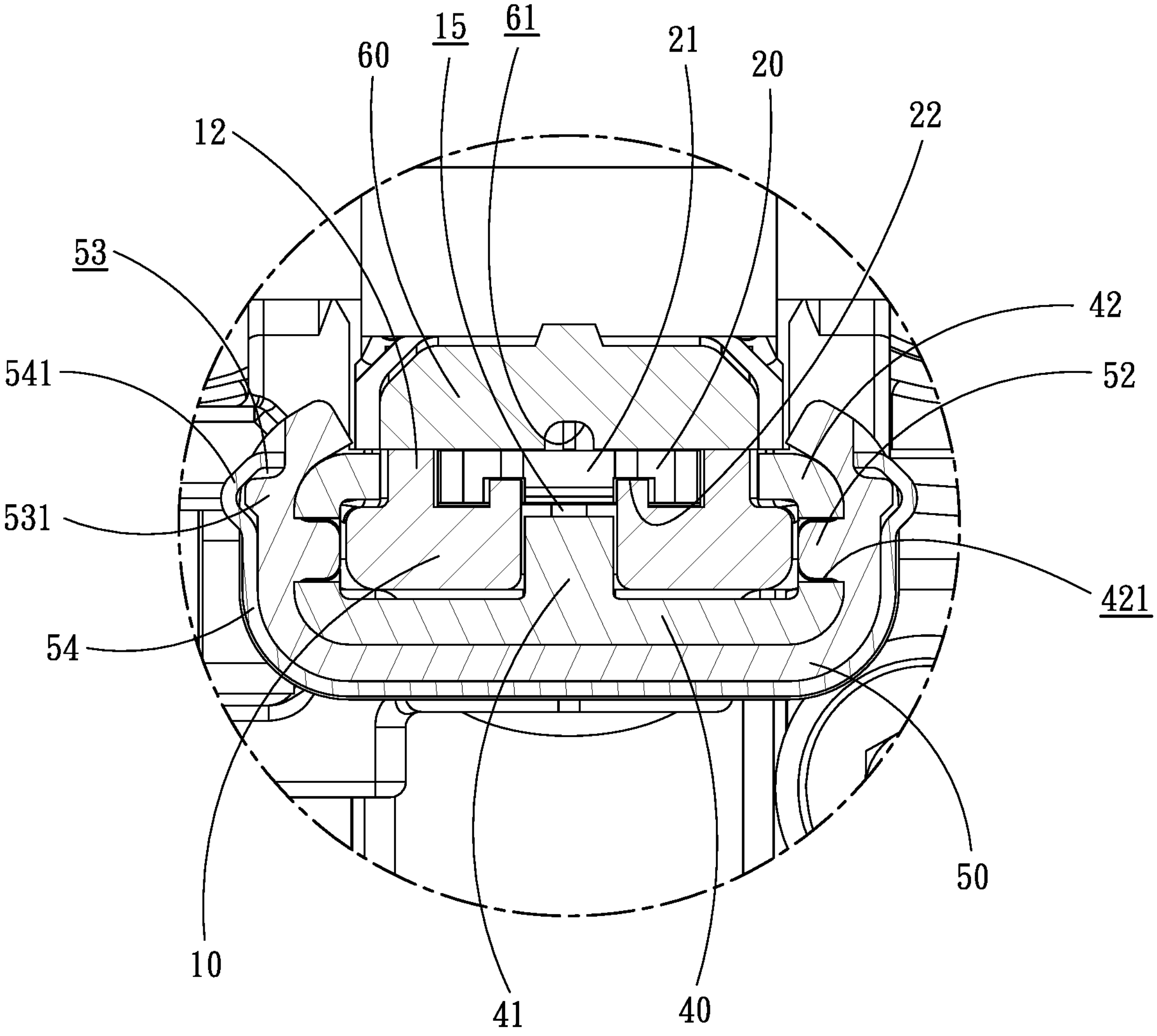
FIG. 4 is a partially enlarged view of FIG. 3.
Figure 5:
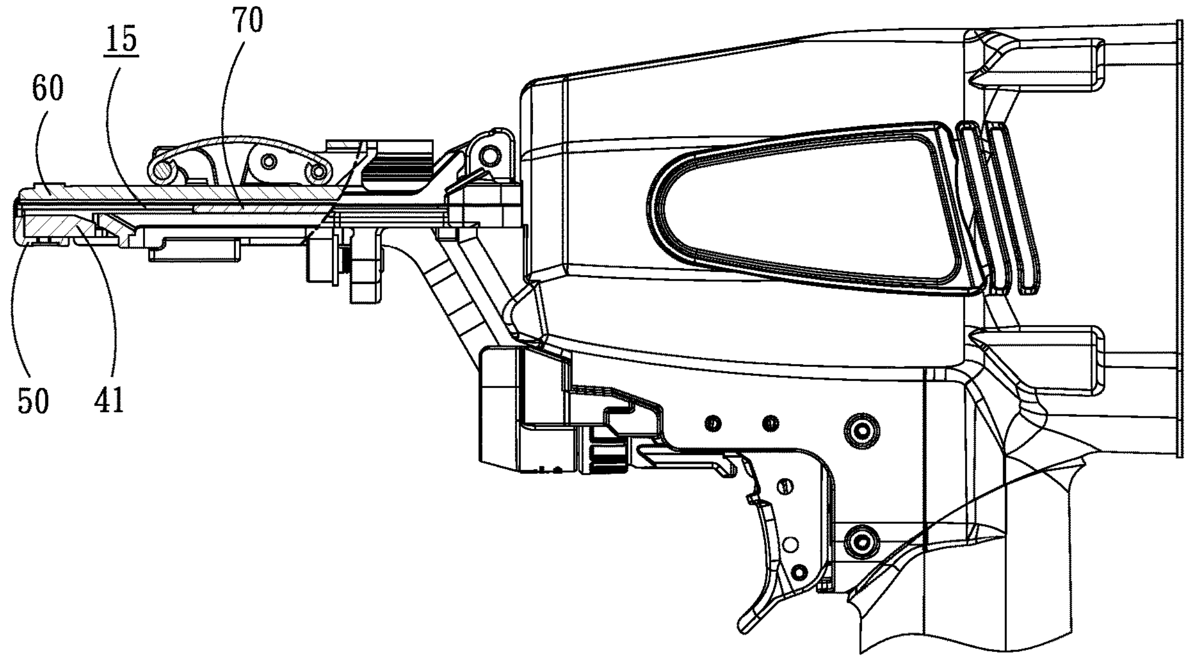
FIG. 5 is a cross sectional view taken along line B-B in FIG. 1.

Referring to FIG. 3 and FIG. 4, in view of FIG. 1, each lateral wall plate 42 comprises a fixing bore 421 passing therethrough, respectively. The corresponding inner edge of the abutting member 50 comprises two fixing flanges 52, wherein the fixing flanges 52 are engaged in the fixing bores 421, so that the abutting member 50 is stably positioned to the required position, so as to be prevented from accidental movement or shaking.

Further, a ring groove 53 is concavely formed surrounding an outer wall of the abutting member 50. The ring groove 53 is fittingly mounted with a reinforcement member 54. An engagement flange 531 is formed on the distal end of two sides of the ring groove 53. The reinforcement member 54 comprises a curved position limiting recess 541 formed corresponding to each engagement flange 531. The position limiting recess 541 is fittingly attached to the corresponding engagement flange 531. Such structure improves the overall structural strength of the abutting member 50, so as to lower the possible deformation or damage, and effectively fix the abutting member 50 in the ring groove 53, thereby preventing it from overly deviation or detachment.

Further referring to FIG. 6 and FIG. 7, in view of FIG. 4, the abutting edge 51 is first used to abut against the surface of a workpiece 80. When the pushing plate 20 is triggered by a force, the counterforce is imposed on the cover 60, and the nail 70 is pushed to the nozzle by the nail pushing block 21 and moves along the nail pushing recess 15 to be projected into the workpiece 80. When the nail 70 passes the position limiting sleeve 40, the protrusion part 41 provides a support to the nail 70, such that a height H is formed between the nail 70 and the protrusion part 41, wherein the height H ranges from 0 mm to 0.5 mm.

Further referring to FIG. 6 and FIG. 7, in view of FIG. 4, the protrusion part 41 comprises a first end 411 and a second end 412. The first end 411 is formed in a rectangular column, and the second end 412 tapers to be inclined toward the direction away from the first end 411. Said inclined angle of the second end 412 allows the nail 70 to pass the protrusion part 41 along the angle, so as to lower the possibility of the nail 70 being stuck at the second end 412 of the protrusion part 41. Further, the length of the protrusion part 41 is larger than half of the length of the position limiting sleeve 40, so as to improve the support area beneath the nail 70, so that the nail 70 has more area to be abutted by the protrusion part 41 before being fired, thereby substantially reducing the deviation of the nail 70 after being fired.

With the foregoing configuration, the present invention achieves following advantages.

The stability of the nail 70 is improved. Due to the limited height H, the deviation of the nail 70 being fired is limited, so as to lower the displacement degree of the nail 70, such that the landing position of the nail 70 is more stable, achieving a neat and even arrangement of nails 70 on the surface of the workpiece 80.

The operation accuracy is enhanced. With the support of the protrusion part 41, when the nail 70 is fired, the nail 70 moves along the nail pushing recess 15 more accurately, so as to ensure the accurate position of the nail 70, thereby improving the accuracy of operation.

The effect of counterforce is reduced. The firing counterforce is concentrated on the cover 60, so that the position limiting sleeve 40 and other parts of the present invention are relatively stable, so as to ensure that the nail 70 is accurately fired.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A nozzle mechanism reducing displacement, comprising:
- a main board comprising a concave groove on a lateral side thereof and two slide rails disposed in a parallel and symmetric arrangement, with a nail feeding channel, a slot, and a nail pushing recess disposed between the two slide rails; the nail pushing recess arranged above the nail feeding channel and the slot, and the nail feeding channel not in communication with the slot;
- a pushing plate comprising a nail pushing block disposed on an end part thereof, two slide grooves concavely disposed in parallel on a bottom part of the pushing plate, the two slide grooves correspondingly disposed in the two slide rails, so that the nail pushing block slides in the nail pushing recess;
- a safety comprising a fixing plate extending from one end of the safety and fixed in the concave groove;
- a position limiting sleeve comprising a protrusion part on a top face thereof, a lateral wall plate extending upward from two sides of the top face of the position limiting sleeve, respectively, the position limiting sleeve being mounted around one end of the two slide rails neighboring the slot, each lateral wall plate wrapping an outer side wall of the corresponding slide rail, the protrusion part being disposed beneath the slot;

an abutting member comprising an abutting edge formed on one end thereof, the abutting member being mounted around and fixed on a bottom face of the position limiting sleeve, one end of the position limiting sleeve abutting against an inner wall of the abutting edge; and a cover comprising a bottom face formed in a plane and having an arc-shaped and concave position limiting groove, the cover being disposed on the main board, such that the position limiting groove is arranged above the nail pushing recess.

2. The nozzle mechanism of claim 1, wherein the protrusion part comprises a first end and a second end; the first end is formed in a rectangular column, and the second end tapers to be inclined toward a direction away from the first end.

3. The nozzle mechanism of claim 1, wherein a length of the protrusion part is larger than half of a length of the position limiting sleeve.

4. The nozzle mechanism of claim 1, wherein a bevel is disposed on a channel wall of one end of the nail feeding channel neighboring the slot; the bevel expands from the nail feeding channel toward the nail pushing recess.

5. The nozzle mechanism of claim 1, wherein the lateral wall plates comprise a fixing bore passing therethrough, respectively; a corresponding inner edge of the abutting member comprises two fixing flanges, and the two fixing flanges are engaged in the two fixing bores.

6. The nozzle mechanism of claim 1, wherein a ring groove is concavely formed surrounding an outer wall of the abutting member; the ring groove is fittingly mounted with a reinforcement member.

7. The nozzle mechanism of claim 6, wherein an engagement flange is formed on a distal end of two sides of the ring groove, the reinforcement member comprises a curved position limiting recess formed corresponding to each of the engagement flanges; each of the position limiting recesses is fittingly attached to the corresponding engagement flange.

8. The nozzle mechanism of claim 1, wherein the main board comprises a protruding strengthening part disposed at a bottom part thereof between the nail feeding channel and the slot, wherein two ends of the strengthening part extend toward a direction away from the slot.

9. The nozzle mechanism of claim 1, wherein the fixing plate comprises a curved lateral side wall, which is bent to contain at least one angle.

10. The nozzle mechanism of claim 1, wherein a nail is disposed above the position limiting sleeve; a height between the nail and the protrusion part ranges from 0 mm to 0.5 mm.

* * * * *